(12) United States Patent
Sato (10) Patent No.: US 11,518,467 B2
(45) Date of Patent: Dec. 6, 2022

(54) AIR BAG DEVICE FOR SADDLED VEHICLE

(71) Applicant: HONDA MOTOR CO., LTD., Tokyo (JP)

(72) Inventor: Takashi Sato, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 165 days.

(21) Appl. No.: 17/048,929

(22) PCT Filed: Apr. 27, 2018

(86) PCT No.: PCT/JP2018/017238
§ 371 (c)(1),
(2) Date: Oct. 19, 2020

(87) PCT Pub. No.: WO2019/207775
PCT Pub. Date: Oct. 31, 2019

(65) Prior Publication Data
US 2021/0146868 A1  May 20, 2021

(51) Int. Cl.
| | |
|---|---|
| *B60R 21/16* | (2006.01) |
| *B62J 27/20* | (2020.01) |
| *B62J 17/04* | (2006.01) |
| *B60R 21/00* | (2006.01) |
| *B62J 50/21* | (2020.01) |

(52) U.S. Cl.
CPC ............... *B62J 27/20* (2020.02); *B60R 21/16* (2013.01); *B62J 17/04* (2013.01); *B60R 2021/0088* (2013.01); *B62J 50/225* (2020.02)

(58) Field of Classification Search
CPC ... B60R 21/16; B60R 2021/0088; B62J 27/20
See application file for complete search history.

(56) References Cited

U.S. PATENT DOCUMENTS

| | | | |
|---|---|---|---|
| 4,427,214 A * | 1/1984 | Haggkvist | B62J 27/20 296/68.1 |
| 7,497,464 B2 * | 3/2009 | Horiuchi | B62J 27/20 280/728.2 |

(Continued)

FOREIGN PATENT DOCUMENTS

| | | |
|---|---|---|
| JP | 2001-219884 | 8/2001 |
| JP | 2005-001507 A | 1/2005 |

(Continued)

OTHER PUBLICATIONS

Indian Office Action dated Apr. 19, 2021, 5 pages.
(Continued)

*Primary Examiner* — Frank B Vanaman
(74) *Attorney, Agent, or Firm* — Rankin, Hill & Clark LLP (57) ABSTRACT

To be able to compactly dispose an airbag device at a front portion of a saddled vehicle. An airbag device for a saddled vehicle including: an inflator; an airbag adapted to be expanded by gas discharged from the inflator; and, a retainer accommodating the airbag, the airbag being deployed upward from an opening of the retainer, in which the retainer is disposed between a meter provided in front of a handle for steering and a headlight provided in front of the meter in a side view of the vehicle.

17 Claims, 7 Drawing Sheets

(56) References Cited

U.S. PATENT DOCUMENTS

| | | | | |
|---|---|---|---|---|
| 7,663,472 | B2* | 2/2010 | Konno | B60R 25/04 340/10.3 |
| 2001/0024361 | A1* | 9/2001 | Suzuki | B62J 50/225 362/23.02 |
| 2003/0218317 | A1* | 11/2003 | Yamazaki | B62J 27/20 280/728.2 |
| 2008/0053728 | A1* | 3/2008 | Sonoda | B60R 21/16 180/190 |

FOREIGN PATENT DOCUMENTS

| | | |
|---|---|---|
| JP | 2005-262975 | 9/2005 |
| JP | 2008-183913 | 8/2008 |

OTHER PUBLICATIONS

European Office Action dated Nov. 23, 2021, 5 pages.
International Search Report, dated Jul. 17, 2018, 1 page.
Written Opinion of the International Searching Authority dated Jul. 17, 2018 filed in PCT/JP2018/017238, 6 pages.
Taiwanese Office Action dated Feb. 12, 2020, 6 pages.
International Preliminary Examination Report dated Apr. 30, 2020, 8 pages.
International Prelminary Report on Patentability dated Oct. 29, 2020, 5 pages.
European Search Report dated Feb. 1, 2021, 12 pages.

* cited by examiner

AIR BAG DEVICE FOR SADDLED VEHICLE

TECHNICAL FIELD

The present invention relates to an airbag device for a saddled vehicle.

BACKGROUND ART

In the related art, an airbag device that includes an inflator, an airbag adapted to be deployed upward, and a retainer accommodating the airbag and that is disposed in front of a passenger at a front portion of a saddled vehicle is known (see Patent Literature 1, for example).

CITATION LIST

Patent Literature

[Patent Literature 1]
Japanese Patent Laid-Open No. 2008-183913

SUMMARY OF INVENTION

Technical Problem

Incidentally, since a handle for steering, a meter, and the like are disposed at a front portion of the saddled vehicle, and a space for disposing components is limited, it is desirable that the airbag device be able to be compactly disposed at a front portion of the saddled vehicle.

An object of the present invention, which has been made in view of the aforementioned circumstances, is to be able to compactly dispose an airbag device at a front portion of a saddled vehicle.

Solution to Problem

According to an aspect of the present invention, there is provided an airbag device for a saddled vehicle including: an inflator (53, 153); an airbag (52, 152) adapted to be expanded by gas discharged from the inflator (53, 153); and a retainer (51, 152) accommodating the airbag (52, 152), the airbag (52, 152) being deployed upward from an opening (58, 158) of the retainer (51, 151), in which the retainer (51, 151) is disposed between a meter (36) provided in front of a handle (23) for steering and a headlight (33) provided in front of the meter (36) in a side view of the vehicle.

Also, in the aspect of the present invention, the inflator (53, 153) may be disposed below a display surface (36a) of the meter (36) in a side view of the vehicle.

Also, in the aspect of the present invention, the retainer (51, 151) may be disposed between the meter (36) and a wind screen (32) provided in front of the meter (36) in a side view of the vehicle.

Also, in the aspect of the present invention, the retainer (51) may include a retainer lower portion (56) disposed below a display surface (36a) of the meter (36) and an upper extending portion (57) extending upward from a front end portion of the retainer lower portion (56), and the upper extending portion (57) may extend upward between the meter (36) and the wind screen (32), and the opening (58) may be provided in an upper surface of the upper extending portion (57).

Further, in the aspect of the present invention, at least a part of the airbag (52) may be accommodated in the retainer lower portion (56).

Further, in the aspect of the present invention, at least a part of the inflator (53) may be accommodated in the retainer lower portion (56).

Also, in the aspect of the present invention, at least a part of the meter (36) may be disposed in a recessed portion (59) formed between the retainer lower portion (56) and the upper extending portion (57).

Also, in the aspect of the present invention, a visor (39) extending upward beyond the meter (36) may be provided between the meter (36) and the wind screen (32), and the retainer (51, 151) may be disposed in a notch portion (60) provided at the visor (39).

Also, in the aspect of the present invention, the retainer (51, 151) may extend toward a rear upper side along the wind screen (32) disposed to be inclined rear-upward in a side view of the vehicle, and the opening (58, 158) provided in an upper surface of the retainer (51, 151) may be located below an upper end (32b) of the wind screen (32).

Advantageous Effects of Invention

The airbag device for a saddled vehicle according to the aspect of the present invention includes: the inflator; the airbag adapted to be expanded by gas discharged from the inflator; and the retainer accommodating the airbag, the airbag is deployed upward from the opening of the retainer, and the retainer is disposed between the meter provided in front of the handle for steering and the headlight provided in front of the meter in a side view of the vehicle.

With this configuration, it is possible to dispose the retainer using a space between the meter provided in front of the handle and the headlight and thereby to compactly dispose the airbag device at a front portion of the saddled vehicle.

Also, in the aspect of the present invention, the inflator may be disposed below the display surface of the meter in a side view of the vehicle. With this configuration, it is possible to compactly dispose the inflator using a space below the display surface of the meter.

Also, in the aspect of the present invention, the retainer may be disposed between the meter and the wind screen provided in front of the meter in a side view of the vehicle. With this configuration, it is possible to dispose the retainer using a space between the meter and the wind screen and thereby to compactly dispose the airbag device at a front portion of the saddled vehicle.

Also, in the aspect of the present invention, the retainer may include the retainer lower portion disposed below the display surface of the meter and the upper extending portion extending upward from the front end portion of the retainer lower portion, the upper extending portion may extend upward between the meter and the wind screen, and the opening may be provided in the upper surface of the upper extending portion. With this configuration, it is possible to secure a larger accommodating portion for the airbag in the retainer using the retainer lower portion disposed below the display surface of the meter. Also, it is possible to deploy the airbag upward from a portion between the meter and the wind screen using the upper extending portion of the retainer.

Further, in the aspect of the present invention, at least a part of the airbag may be accommodated in the retainer lower portion. With this configuration, the retainer lower portion allows to compactly dispose the airbag using a space below the meter.

Further, in the aspect of the present invention, at least a part of the inflator may be accommodated below the retainer.

With this configuration, the retainer lower portion allows the inflator to be compactly disposed using a space below the meter.

Also, in the aspect of the present invention, at least a part of the meter may be disposed in the recessed portion formed between the retainer lower portion and the upper extending portion. With this configuration, it is possible to compactly dispose the meter using the recessed portion formed between the retainer lower portion and the upper extending portion.

Also, in the aspect of the present invention, the visor extending upward beyond the meter may be provided between the meter and the wind screen, and the retainer may be disposed in the notch portion provided at the visor. With this configuration, it is possible to dispose the retainer using a space of the visor and thereby to compactly provide the retainer.

Also, in the aspect of the present invention, the retainer may extend toward the rear upper side along the wind screen disposed to be inclined rear-upward in a side view of the vehicle, and the opening provided in the upper surface of the retainer may be located below the upper end of the wind screen. With this configuration, it is possible to guide a deploying direction of the airbag adapted to be deployed upward from the opening, using the wind screen.

DESCRIPTION OF EMBODIMENT

Hereinafter, an embodiment of the present invention will be described with reference to drawings. Note that indications of directions such as front, rear, left, right, up, and down in the description will be defined to be the same as directions relative to a vehicle body unless particularly indicated otherwise. Also, the reference sign FR represented in each diagram represents the front side of the vehicle body, the reference sign UP represents the upper side of the vehicle body, and the reference sign LH represents the left side of the vehicle body.

First Embodiment

Figure 1:
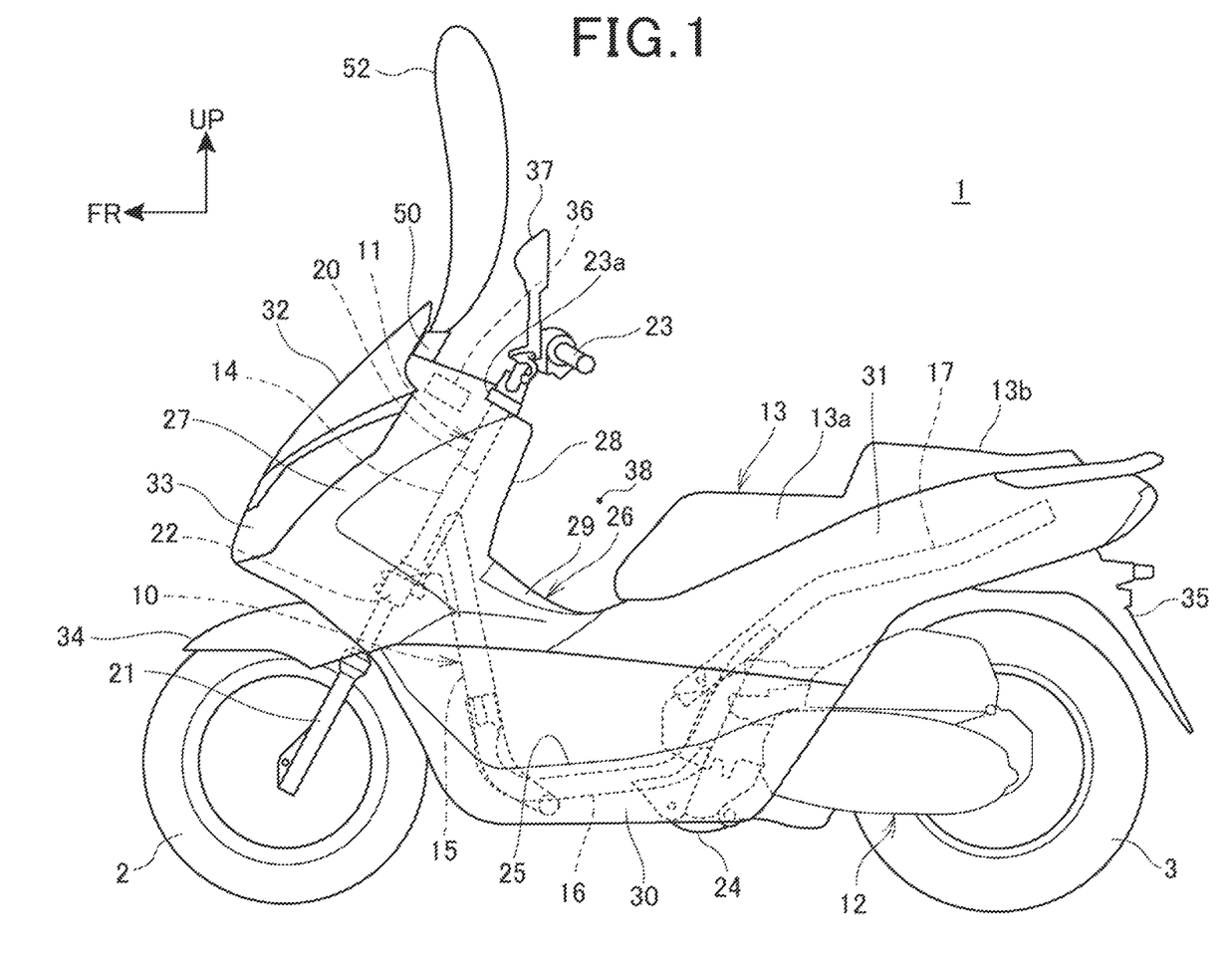
FIG. 1 is a left side view of a motorcycle according to an embodiment of the present invention.

FIG. 1 is a left side view of a motorcycle 1 according to a first embodiment of the present invention. In FIG. 1, a state in which an airbag 52 that will be described later has been expanded and deployed. Note that FIG. 1 illustrates only components on the left side including reference signs for components that are provided as pairs on the left and right sides.

The motorcycle 1 is a saddled vehicle of a scooter type including a vehicle body frame 10, a steering system 11 adapted to support a front wheel 2 in a steerable manner, a power unit 12 supported at a rear portion of the vehicle body frame 10, a rear wheel 3, and a seat 13 in which a passenger is seated in a straddling manner.

The vehicle body frame 10 includes a head pipe 14 provided at a front end of the vehicle body frame 10, a main frame 15 extending toward a rear lower side from the head pipe 14, a pair of left and right lower frames 16, 16 extending backward from a lower end portion of the main frame 15, and a pair of left and right rear frames 17, 17 extending backward toward a rear upper side from the lower frames 16, 16. The head pipe 14 is disposed at the center of a vehicle width similarly to the front wheel 2.

The steering system 11 includes a steering shaft 20 pivotally supported by the head pipe 14, a pair of left and right front forks 21, 21 disposed on both left and right sides of the front wheel 2 and supporting the front wheel 2, a bridge member 22 secured to a lower end of the steering shaft 20 and coupling upper portions of the left and right front forks 21, 21, and a handle 23 secured to an upper end of the steering shaft 20. The handle 23 for steering is connected to the steering shaft 20 via a handle post 23a secured to the upper end of the steering shaft 20.

In a side view of the vehicle, the head pipe 14 is inclined backward with respect to the vertical direction by the amount of a predetermined caster angle set in the motorcycle 1. The steering shaft 20 is inserted into and pivotally supported by the head pipe 14 and is disposed so as to be inclined backward in a side view of the vehicle.

The power unit 12 is a unit swing engine that has functions of an engine as a drive source for the rear wheel 3 and of a swing arm that supports the rear wheel 3. The power unit 12 is pivotally supported by the vehicle body frame 10 so as to be able to swing via a link member 24 provided at a front end portion of the power unit 12.

The seat 13 is provided above the rear frame 17. The seat 13 includes a front-side seat 13a in which a driver is seated and rear-side seat 13b in which a fellow passenger is seated in an integrated manner.

A pair of left and right step floors 25, 25 on which the driver places his/her left and right feet are provided on a front lower side of the front-side seat 13a.

The motorcycle 1 includes a vehicle body cover 26 adapted to cover a vehicle body such as the vehicle body frame 10.

The vehicle body cover 26 includes a front cover 27 that covers upper portions of the head pipe 14 and the steering system 11 from the front side and from the left and right sides and an inner cover 28 that is continued to a rear edge of the front cover 27 and covers the upper portions of the head pipe 14 and the steering system 11 from the rear side.

Also, the vehicle body cover 26 includes a center cover 29 located on a front lower side of the front-side seat 13a, an undercover 30 that covers the vehicle body from the lower side below the step floors 25, 25, and a rear-side cover 31 that covers the rear frames 17, 17 from the sides below the seat 13.

A wind screen 32 that is inclined toward the rear upper side in a side view of the vehicle is attached to an upper portion of the front cover 27. A headlight 33 is provided on a front surface of the front cover 27.

The motorcycle 1 includes a front fender 34 and a rear fender 35.

The meter 36 adapted to display information regarding the motorcycle 1 such as a vehicle speed is disposed in front of the handle 23. Rear-view mirrors 37, 37 are attached to the handle 23.

A front portion of the center cover 29 is continued to a lower portion of the inner cover 28. The center cover 29 is located inside left and right legs of the driver stretched from the front-side seat 13a to the step floors 25, 25.

A straddled space 38 recessed downward is sectioned by the inner cover 28, the center cover 29, and a front surface of the front-side seat 13a in a side view of the vehicle. The passenger can straddle the motorcycle 1 via the straddled space 38 when the passenger rides on and gets off the motorcycle 1.

The motorcycle 1 includes an airbag device 50 adapted to protect the passenger from impact. The airbag device 50 is disposed between the steering system 11 and the wind screen 32 in a side view of the vehicle and is located in front of the handle 23.

Figure 2:
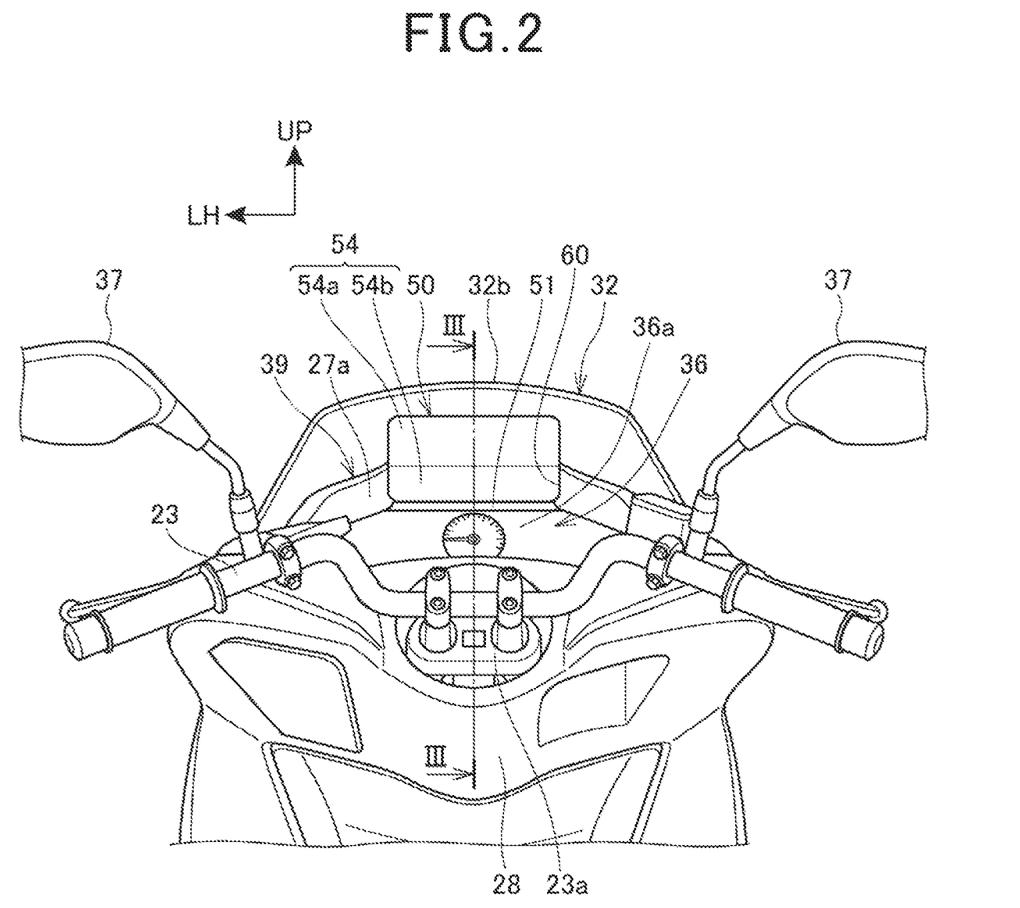
FIG. 2 is a perspective view of a peripheral portion of a handle at a front portion of a motorcycle when seen from a rear side.
Figure 3:
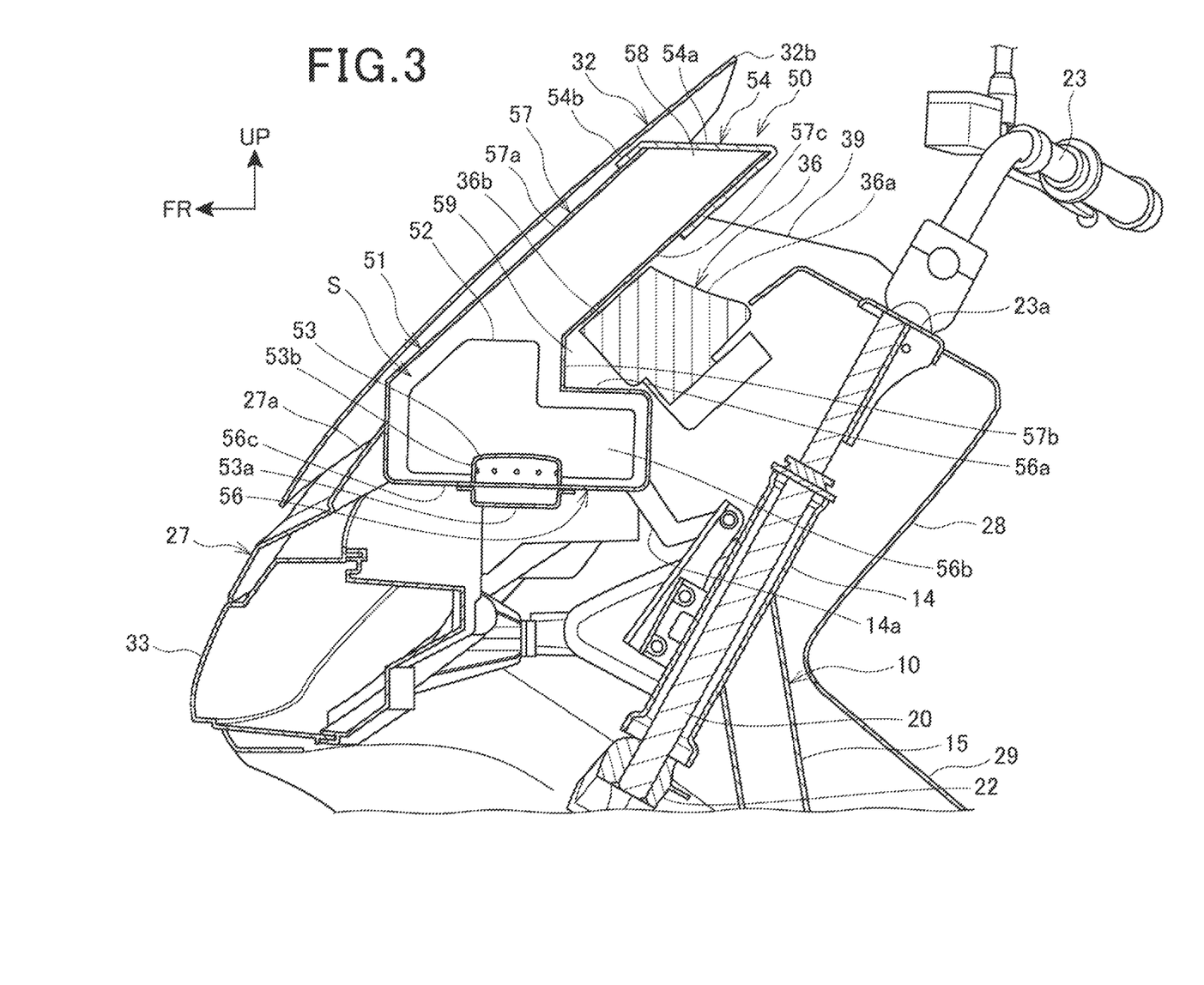
FIG. 3 is a sectional view along III-III in FIG. 2.
Figure 4:
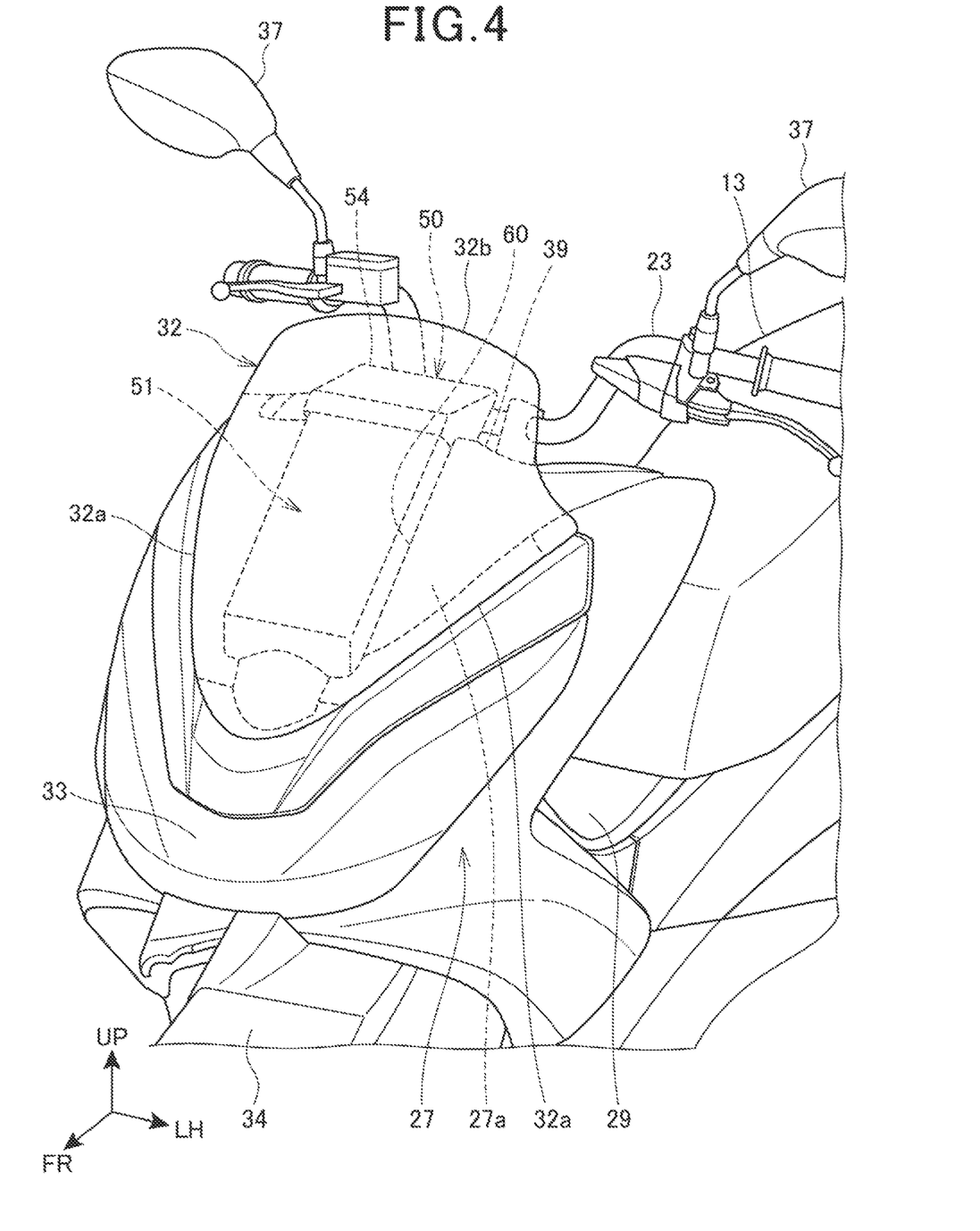
FIG. 4 is a perspective view of a front portion of the motorcycle when seen from a left front side.

FIG. 2 is a diagram of a peripheral portion of the handle 23 at a front portion of the motorcycle 1 when seen from the rear side. FIG. 3 is a sectional view along III-III in FIG. 2. FIG. 4 is a perspective view of the front portion of the motorcycle 1 when seen from the left front side.

Referring to FIGS. 2 to 4, the meter 36 is formed into a flat box shape and is disposed such that a plate thickness direction is oriented in an up-down direction. The meter 36 has a rectangular shape that is long in a vehicle width direction when seen from the upper side.

The meter 36 is disposed at the center of the vehicle width above the head pipe 14 and in front of the handle post 23a. The meter 36 is disposed such that a display surface 36a on the upper surface thereof is inclined toward a rear lower side in order for the driver on the rear upper side to easily view the meter 36.

Since the meter 36 is secured to the vehicle body, the meter 36 does not turn even when the handle 23 is steered.

A headlight 33 is provided at a lower portion of a front surface portion of the front cover 27. A wind screen 32 is attached to an upper portion 27a of the front surface portion of the front cover 27. The headlight 33 is disposed on the front lower side of the meter 36.

The front cover 27 includes a visor 39 covering the meter 36 from the front upper side. The visor 39 is an eaves-shaped wall portion extending rear-upward in front of the meter 36. The visor 39 is the upper portion 27a of the front surface portion of the front cover 27 extending upward beyond the meter 36.

The wind screen 32 is a plate member curved such that the center portion thereof in the vehicle width direction corresponds to a front end portion over the entire member in the up-down direction and is formed in a curved shape protruding forward.

Both side edge portions 32a, 32a (FIG. 4) of the wind screen 32 in the vehicle width direction (left-right direction) are secured to the upper portion 27a of the front surface portion of the front cover 27.

Since the wind screen 32 is curbed on the front side, a space is formed between a rear surface of the wind screen 32 and the upper portion 27a of the front surface portion of the front cover 27 inside both the left and right side edge portions of the wind screen 32.

The wind screen 32 is a plate member that covers the visor 39, the airbag device 50, and the meter 36 from the front side. An upper end 32b of the wind screen 32 is located above the visor 39.

The wind screen 32 is formed of a light-transmitting material such that the passenger can view the front side through the wind screen 32. The visor 39 is provided to block light reaching the upper surface of the meter 36 from the front upper side. The visor 39 is nontransparent and has lower light transmittance than the wind screen 32.

The vehicle body frame 10 includes a stay 14a extending forward from the head pipe 14 (FIG. 3). The headlight 33 and the front cover 27 are supported by the stay 14a.

The airbag device 50 is disposed between the meter 36 and the wind screen 32 on the front upper side of the head pipe 14 in a side view of the vehicle.

The airbag device 50 includes a box-shaped retainer 51, the airbag 52 accommodated in the retainer 51, an inflator 53 adapted to discharge gas into the airbag 52, and a cap member 54 adapted to block the upper surface of the retainer 51.

Figure 5:
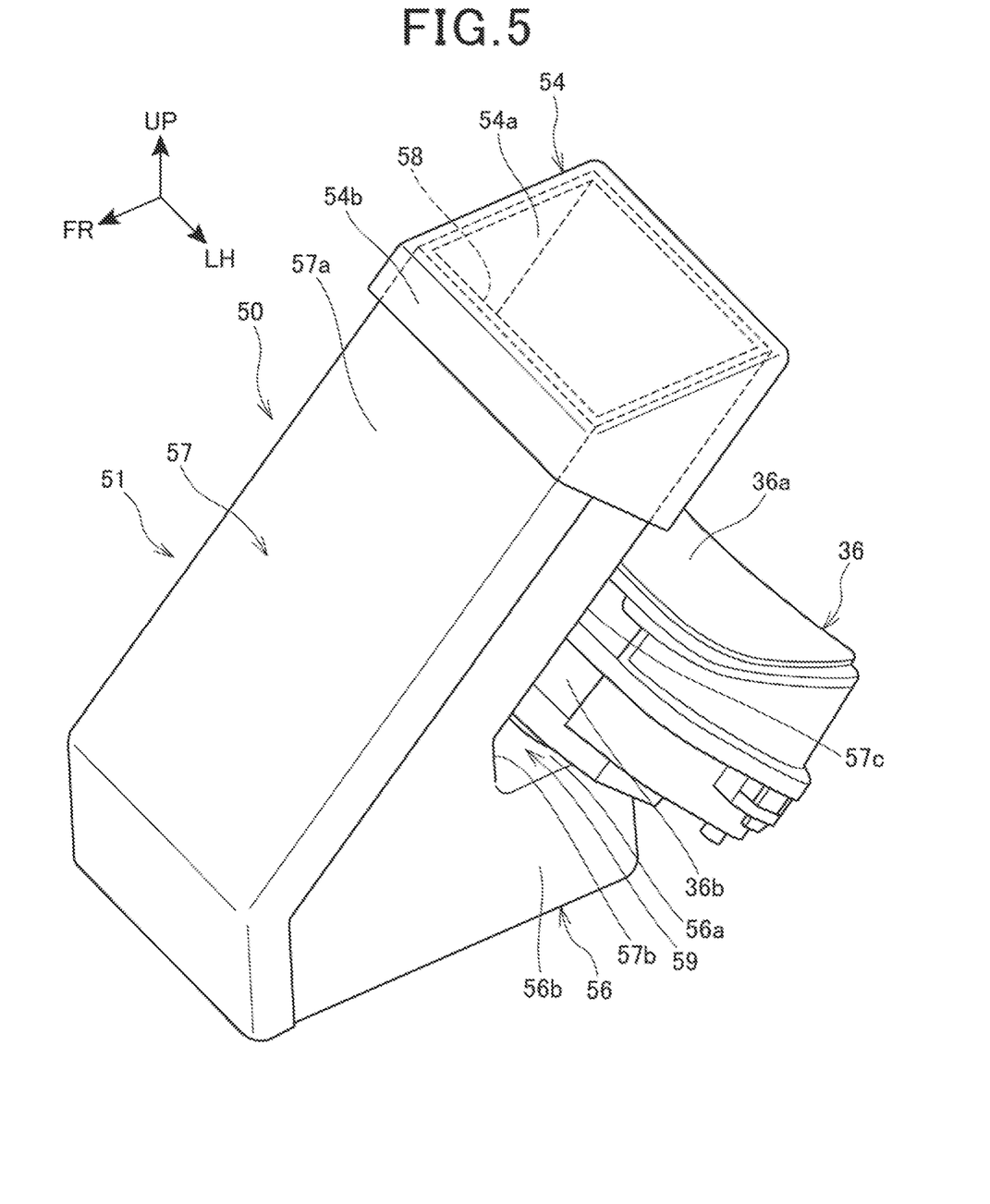
FIG. 5 is a perspective view of an airbag device and a meter when seen from the left front side.
Figure 6:
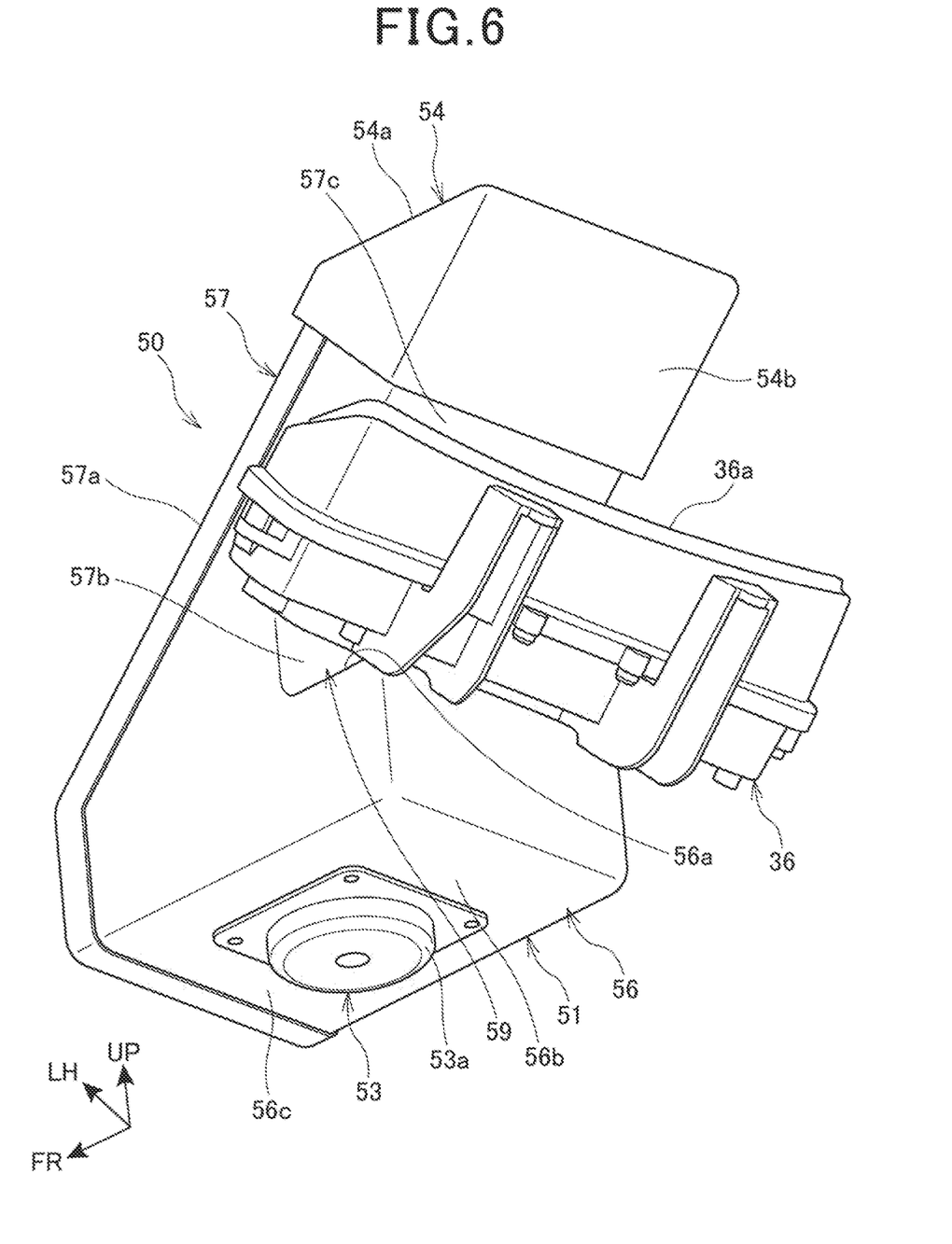
FIG. 6 is a perspective view of the airbag device and the meter when seen from a left rear side.

FIG. 5 is a perspective view of the airbag device 50 and the meter 36 when seen from the left front side. FIG. 6 is a perspective view of the airbag device 50 and the meter 36 when seen from the left rear side.

Referring to FIGS. 3 to 6, the retainer 51 is disposed above the head pipe 14 and at the center of the vehicle width. Also, the retainer 51 is disposed between the meter 36 and the wind screen 32 in a front-back direction of the vehicle. The retainer 51 is located above a rear portion of the headlight 33 accommodated in the front cover 27 and is disposed between the headlight 33 and the meter 36 in a side view of the vehicle.

The retainer 51 includes a retainer lower portion 56 disposed below the meter 36 and an upper extending portion 57 extending toward the rear upper side from a front end portion of the retainer lower portion 56 in a side view of the vehicle. The retainer 51 has a substantially L shape in a side view of the vehicle.

The retainer 51 is supported by the stay 14a at the front portion of the head pipe 14.

The retainer 51 has a box shape with a hollow inside and includes an airbag accommodation space S accommodating the airbag 52. The airbag accommodation space S is configured of an inner space of the retainer lower portion 56 and an inner space of the upper extending portion 57.

An opening 58 opened upward is provided in an upper surface of the upper extending portion 57.

The retainer lower portion 56 extends substantially horizontally forward from a front-side position of the upper end portion of the head pipe 14 up to the upper portion 27a of the front surface portion of the front cover 27 in a side view of the vehicle. The retainer lower portion 56 is disposed between the headlight 33 and the meter 36 in a side view of the vehicle and is located below the display surface 36a of the meter 36. Specifically, the retainer lower portion 56 overlaps, from the lower side, the meter 36 in top view facing the display surface 36a of the meter 36. Also, a rear portion of the retainer lower portion 56 also overlaps, from the lower side, the meter 36 in a plan view in the vertical direction.

The rear portion of the retainer lower portion 56 is an overlapping portion 56b that overlaps, from the lower side, the front portion of the meter 36 in a plan view.

The upper extending portion 57 obliquely extends toward the rear upper side from the upper portion of the front end portion of the retainer lower portion 56. The upper extending portion 57 extends toward the rear upper side through a portion between the meter 36 and the wind screen 32. The upper extending portion 57 is located between the wind screen 32 and the meter 36 in a side view of the vehicle.

Specifically, the front surface 57a of the upper extending portion 57 is an inclined surface extending rear-upward along the rear surface of the wind screen 32.

The rear surface of the upper extending portion 57 includes a vertical wall portion 57b extending substantially vertically upward from the upper surface 56a of the rear portion of the retainer lower portion 56 and a rear surface inclined portion 57c extending rear-upward from the upper end of the vertical wall portion 57b. The rear surface inclined portion 57c is substantially parallel to the front surface 57a.

The meter 36 is disposed to be inclined backward such that the display surface 36a is inclined back-downward, and the front surface 36b of the meter 36 is inclined rear-upward substantially in parallel to the rear surface inclined portion 57c of the upper extending portion 57. The upper extending portion 57 extends toward the rear upper side between the rear surface of the wind screen 32 and the front surface 36b of the meter 36.

The upper extending portion 57 extends upward relative to the display surface 36a of the meter 36 and covers the display surface 36a from the upper side.

The opening 58 in the upper surface of the upper extending portion 57 is located below the upper end 32b of the wind screen 32.

The retainer 51 includes a recessed portion 59 recessed on the front side in a side view of the vehicle, between the retainer lower portion 56 and the upper extending portion 57. The recessed portion 59 is sectioned by the upper surface 56a of the rear portion of the retainer lower portion 56, the vertical wall portion 57b, and the rear surface inclined portion 57c in a side view of the vehicle.

The meter 36 has a front portion disposed in the recessed portion 59 with the front surface 36b facing the rear surface inclined portion 57c in a side view of the vehicle. It is thus possible to compactly dispose the meter 36 using the recessed portion 59. The meter 36 is longer than the retainer 51 in the vehicle width direction, and both end portions thereof in the vehicle width direction project outward from the retainer 51 in the vehicle width direction.

An inflator 53 is provided in a bottom surface 56c of the retainer lower portion 56 and is located below the display surface 36a of the meter 36. Specifically, the inflator 53 overlaps, from the lower side, the meter 36 in top view facing the display surface 36a of the meter 36. Also, the rear end portion of the inflator 53 also overlaps, from the lower side, the meter 36 in a plan view in the vertical direction.

The inflator 53 is disposed at the center of the retainer lower portion 56 in the vehicle width direction. The bottom surface 56c is substantially horizontal in a side view of the vehicle.

The inflator 53 includes a cylindrical housing 53a. A gas forming agent and an initiator that causes the gas forming agent to start a reaction of generating gas are provided inside the housing 53a. The initiator includes an ignition device. A gas discharge portion 53b of the inflator 53 is located inside the retainer lower portion 56.

The rear portion of the inflator 53 is disposed in the overlapping portion 56b of the retainer lower portion 56 and overlaps, from the lower side, the front portion of the meter 36 in a plan view. In other words, the inflator 53 is at least partially disposed below the meter 36. For this reason, it is possible to compactly dispose the inflator 53 using a space below the meter 36.

As illustrated in FIG. 3, the airbag 52 is accommodated in the airbag accommodation space S of the retainer 51 and the rear portion is disposed in the overlapping portion 56b. In other words, the airbag 52 partially overlaps the meter 36 from the lower side in a plan view from the upper side. Therefore, it is possible to compactly dispose the airbag 52 using the space below the meter 36. The airbag 52 is accommodated in the retainer 51 in a folded state. A lower end portion of the airbag 52 is connected to the inflator 53.

The motorcycle 1 includes an acceleration sensor (not illustrated) adapted to detect impact acting on the motorcycle 1. The acceleration sensor is electrically connected to a control unit (not illustrated) of the motorcycle 1, and the control unit is electrically connected to the inflator 53. The control unit determines whether or not to operate the airbag device 50 on the basis of detected acceleration. In a case in which the airbag device 50 is to be operated, the control unit operates the inflator 53 to discharge gas into the airbag 52. The airbag 52 is expanded by a gas pressure and is deployed upward.

A cap member 54 includes a cap upper surface portion 54a adapted to cover the opening 58 from the upper side and a cap peripheral wall portion 54b fitted to a peripheral edge portion of the opening 58 in an integrated manner.

The cap member 54 is attached to the retainer 51 by the inner peripheral surface of the cap peripheral wall portion 54b being fitted to the outer peripheral surface of the peripheral edge portion of the opening 58.

Referring to FIGS. 2 to 4, the upper portion 27a of the front surface portion of the front cover 27 includes, at a center in the vehicle width direction, a notch portion 60 extending downward from an upper edge of the upper portion 27a that is an upper edge of the visor 39. The notch portion 60 has a substantially rectangular shape extending in an up-down direction from the portion of the visor 39 up to the lower portion of the upper portion 27a.

The retainer 51 is disposed in the notch portion 60. Specifically, the retainer 51 has the upper extending portion 57 disposed in the notch portion 60, and the upper extending portion 57 extends rear-upward along the upper portion 27a.

The upper end portion of the upper extending portion 57 and the cap member 54 are located in the notch portion 60, thereby configuring the center of the visor 39 in the vehicle width direction. The upper end portion of the upper extending portion 57 and the cap member 54 cover, from the front upper side, the display surface 36a of the meter 36.

Once gas is discharged from the inflator 53, the airbag 52 is expanded by gas and is deployed upward through the upper extending portion 57 of the retainer 51. Once the airbag 52 expands, the cap member 54 is pushed and cleaved by the airbag 52, and the airbag 52 (see FIG. 1) is deployed from the opening 58 to the outer upper side.

The airbag 52 deployed upward from the opening 58 is guided toward the rear upper side by the rear surface of the wind screen 32 above the opening 58 and is deployed upward.

In the present first embodiment, the retainer 51 is disposed using a space between the meter 36 and the headlight 33, and it is possible to compactly dispose the retainer 51.

Also, the retainer 51 is disposed using the space between the meter 36 and the wind screen 32, and it is thus possible to compactly dispose the retainer 51 and to guide a deploying direction of the airbag 52 deployed upward from the retainer 51 in an appropriate direction by the wind screen 32.

Also, the retainer 51 is provided above the head pipe 14 and is located near the upper body of the passenger from the head to the breast in the up-down direction. It is thus possible to appropriately protect the passenger even when the length of the airbag 52 in the up-down direction in a deployed state is reduced and thereby to reduce the size of the airbag device 50.

As described above, according to the first embodiment to which the present invention is applied, the airbag device 50 of the motorcycle 1 includes: the inflator 53, the airbag 52 adapted to be expanded by gas discharged from the inflator 53, the retainer 51 accommodating the airbag 52, the airbag 52 expands upward from the opening 58 of the retainer 51, and the retainer 51 is disposed between the meter 36 provided in front of the handle 23 for steering in a side view of the vehicle and the headlight 33 provided in front of the meter 36.

With this configuration, it is possible to dispose the retainer 51 using the space between the meter 36 and the headlight 33 provided in front of the handle 23 and thereby to compactly dispose the airbag device 50 at the front portion of the motorcycle 1.

Also, the inflator 53 is disposed below the display surface 36a of the meter 36 in a side view of the vehicle. With this configuration, it is possible to compactly dispose the inflator 53 using the space below the display surface 36a of the meter 36.

Also, the retainer 51 may be disposed between the meter 36 and the wind screen 32 provided in front of the meter 36 in a side view of the vehicle. With this configuration, it is possible to dispose the retainer 51 using the space between the meter 36 and the wind screen 32 and thereby to compactly dispose the airbag device 50 at the front portion of the motorcycle 1.

Also, the retainer 51 includes the retainer lower portion 56 disposed below the display surface 36a of the meter 36 and the upper extending portion 57 extending upward from the front end portion of the retainer lower portion 56, and the upper extending portion 57 extends upward between the meter 36 and the wind screen 32, and the opening 58 is provided in the upper surface of the upper extending portion 57. With this configuration, the retainer lower portion 56 disposed below the display surface 36a of the meter 36 allows to secure a large size of airbag accommodation space S that is an accommodation portion of the airbag 52 in the retainer 51. Also, the upper extending portion 57 of the retainer 51 allows to deploy the airbag 52 upward from the portion between the meter 36 and the wind screen 32.

Further, at least a part (rear portion) of the airbag 52 is accommodated in the retainer lower portion 56. With this configuration, the retainer lower portion 56 allows to compactly dispose the airbag 52 using the space below the meter 36.

Also, at least a part (rear portion) of the inflator 53 is accommodated in the retainer lower portion 56. With this configuration, the retainer lower portion 56 allows to compactly dispose the inflator using the space below the meter 36.

Also, at least a part (front portion) of the meter 36 is disposed in the recessed portion 59 formed between the retainer lower portion 56 and the upper extending portion 57. With this configuration, it is possible to compactly dispose the meter 36 using the recessed portion 59 formed between the retainer lower portion 56 and the upper extending portion 57.

Also, the visor 39 extending upward beyond the meter 36 is provided between the meter 36 and the wind screen 32, and the retainer 51 is disposed in the notch portion 60 provided at the visor 39. With this configuration, it is possible to dispose the retainer 51 using the space of the visor 39 and thereby to compactly provide the retainer 51. Also, it is possible to use the retainer 51 as a shading visor for the meter 36.

Also, the retainer 51 extends toward the rear upper side along the wind screen 32 disposed to be inclined rear-upward in a side view of the vehicle, and the opening 58 provided in the upper surface of the retainer 51 is located below the upper end 32b of the wind screen 32. With this configuration, it is possible to guide the deploying direction of the airbag 52 deployed upward from the opening 58 by the wind screen 32.

Second Embodiment

Figure 7:
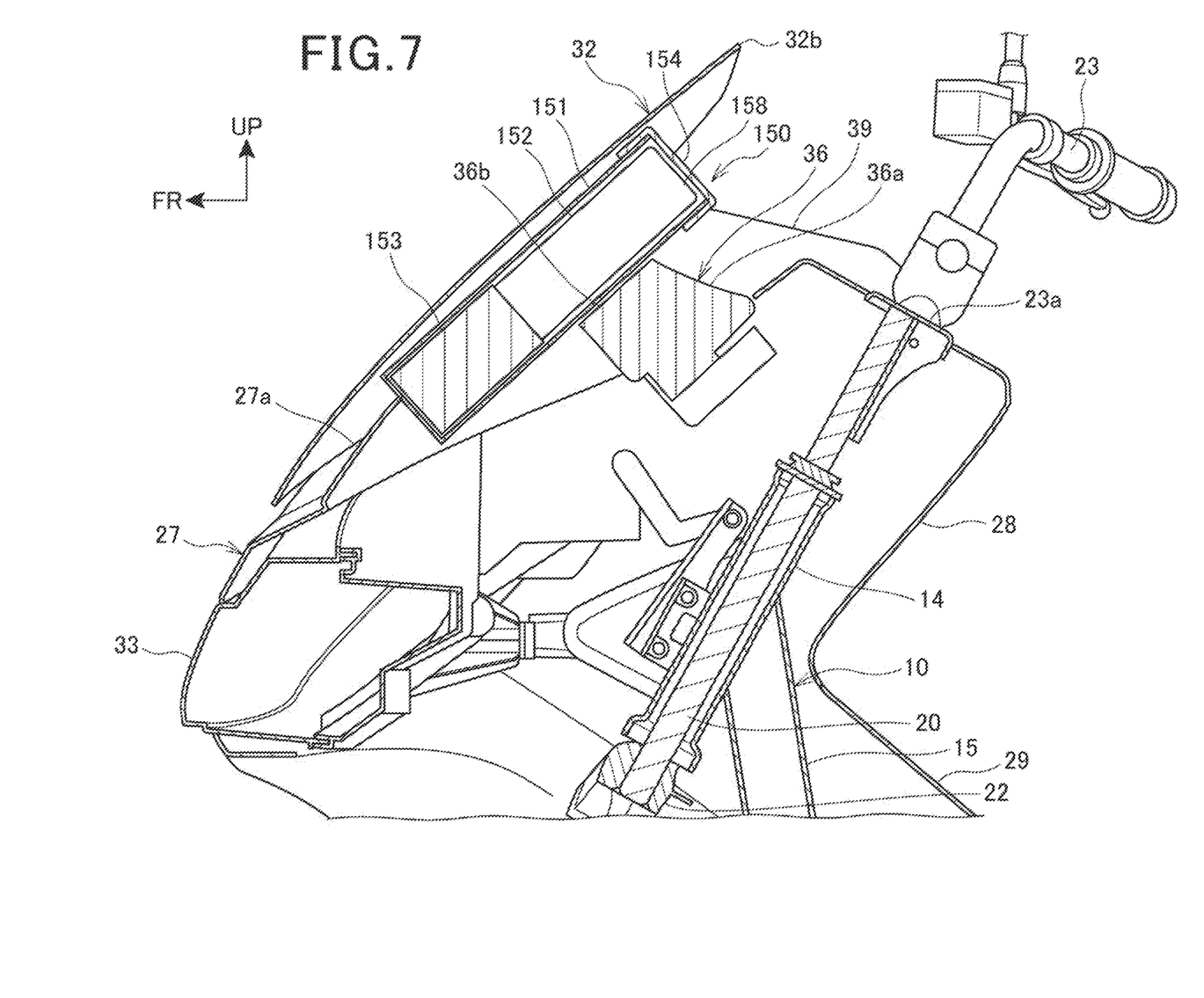
FIG. 7 is a sectional view along III-III in FIG. 2 according to a second embodiment.

FIG. 7 is a sectional view along III-III in FIG. 2 according to a second embodiment.

In this second embodiment, the same reference signs will be applied to portions configured similarly to those in the aforementioned first embodiment, and description thereof will be omitted.

An airbag device 150 is disposed between the wind screen 32 and the meter 36 in a side view of the vehicle.

The airbag device 150 includes a retainer 151, an airbag 152 accommodated in the retainer 151, an inflator 153 adapted to discharge gas into the airbag 152, and a cap member 154 adapted to block the upper surface of the retainer 151.

The retainer 151 has a box shape that is long in the up-down direction in a side view of the vehicle. The retainer 151 is disposed to be inclined rear-upward along the rear surface of the wind screen 32.

An opening 158 that is opened upward is provided in an upper surface of the retainer 151.

The retainer 151 is disposed between the wind screen 32 and the meter 36 in a side view of the vehicle. Also, a lower portion of the retainer 151 is located between the headlight 33 and the meter 36 and is located below the display surface 36a of the meter 36 in a side view of the vehicle. The retainer 151 is disposed in the notch portion 60 (FIG. 4) of the visor 39.

The inflator 153 is disposed at a lower portion in the retainer 151 and discharges gas toward the rear upper side. In other words, the inflator 153 is vertically placed such that a gas discharge direction is the up-down direction. The inflator 153 is disposed below the display surface 36a of the meter 36. It is thus possible to compactly dispose the inflator 153 using a space below the display surface 36a.

The airbag 152 has a lower end connected to the inflator 153.

Once gas is discharged from the inflator 153, the airbag 152 is expanded upward by gas and cleaves the cap member 154. The airbag 152 is deployed toward the outer upper side from the opening 158.

The airbag 152 deployed upward from the opening 158 is guided toward the rear upper side by the rear surface of the wind screen 32 above the opening 158 and is deployed upward.

Note that the aforementioned first and second embodiments illustrate aspects to which the present invention is applied, and the present invention is not limited to the aforementioned first and second embodiments.

Although the wind screen 32 provided in front of the visor 39 has been described as an example of the wind screen in the aforementioned first and second embodiments, the present invention is not limited thereto. The wind screen may be any wall-shaped member provided to stand in front of the meter 36, and in a case in which the wind screen 32 is not included, for example, the airbag device 50 may be disposed between the visor 39 (meter visor) and the meter provided behind the visor 39. In this case, the visor 39 serves as a wind screen. Also, the wind screen may not have light transmittance.

Also, although the motorcycle 1 has been described as an example of a saddled vehicle in the aforementioned first and second embodiments, the present invention is not limited thereto, and the present invention can be applied to a three-wheel saddled vehicle provided with two front wheels or rear wheels or a saddled vehicle provided with four or more wheels.

REFERENCE SIGNS LIST

1 Motorcycle (saddled vehicle)
23 Handle
32 Wind screen
32b Upper end
33 Headlight
36 Meter
36a Display surface
39 Visor
50, 150 Airbag device
51, 151 Retainer
52, 152 Airbag
53, 153 Inflator
56 Retainer lower portion
57 Upper extending portion
58, 158 Opening
59 Recessed portion
60 Notch portion

The invention claimed is:

1. An airbag device for a saddled vehicle comprising:
an inflator;
an airbag adapted to be expanded by gas discharged from the inflator; and
a retainer accommodating the airbag, the airbag being deployed upward from an opening of the retainer,
wherein the retainer is disposed between a meter provided in front of a handle for steering and a headlight provided in front of the meter in a side view of the vehicle,
the retainer is disposed between the meter and a wind screen provided in front of the meter in the side view of the vehicle,
the retainer includes a retainer lower portion overlapping the meter from a lower side in a plan view and an upper extending portion extending upward from a front end portion of the retainer lower portion,
the upper extending portion extends upward between the meter and the wind screen, and the opening is provided in an upper surface of the upper extending portion,
the retainer extends toward a rear upper side along the wind screen disposed to be inclined rear-upward in the side view of the vehicle,
the opening provided in the upper surface of the upper extending portion is located below an upper end of the wind screen, and
the upper extending portion extends upward relative to a display surface on an upper surface of the meter and covers the display surface from an upper side.

2. The airbag device for a saddled vehicle according to claim 1,
wherein the inflator is disposed below a display surface of the meter in a side view of the vehicle.

3. The airbag device for a saddled vehicle according to claim 2,
wherein at least a part of the airbag is accommodated in the retainer lower portion.

4. The airbag device for a saddled vehicle according to claim 2,
wherein at least a part of the inflator is accommodated in the retainer lower portion.

5. The airbag device for a saddled device according to claim 2,
wherein at least a part of the meter is disposed in a recessed portion formed between the retainer lower portion and the upper extending portion.

6. The airbag device for a saddled vehicle according to claim 2,
wherein a visor extending upward beyond the meter is provided between the meter and the wind screen, and the retainer is disposed in a notch portion provided at the visor.

7. The airbag device for a saddled vehicle according to claim 1,
wherein at least a part of the airbag is accommodated in the retainer lower portion.

8. The airbag device for a saddled vehicle according to claim 7,
wherein at least a part of the inflator is accommodated in the retainer lower portion.

9. The airbag device for a saddled device according to claim 7,
wherein at least a part of the meter is disposed in a recessed portion formed between the retainer lower portion and the upper extending portion.

10. The airbag device for a saddled vehicle according to claim 7,
wherein a visor extending upward beyond the meter is provided between the meter and the wind screen, and the retainer is disposed in a notch portion provided at the visor.

11. The airbag device for a saddled vehicle according to claim 1,
wherein at least a part of the inflator is accommodated in the retainer lower portion.

12. The airbag device for a saddled device according to claim 11,
wherein at least a part of the meter is disposed in a recessed portion formed between the retainer lower portion and the upper extending portion.

13. The airbag device for a saddled vehicle according to claim 11,
wherein a visor extending upward beyond the meter is provided between the meter and the wind screen, and the retainer is disposed in a notch portion provided at the visor.

14. The airbag device for a saddled device according to claim 1,
wherein at least a part of the meter is disposed in a recessed portion formed between the retainer lower portion and the upper extending portion.

15. The airbag device for a saddled vehicle according to claim 14,
wherein a visor extending upward beyond the meter is provided between the meter and the wind screen, and the retainer is disposed in a notch portion provided at the visor.

16. The airbag device for a saddled vehicle according to claim 1,
wherein a visor extending upward beyond the meter is provided between the meter and the wind screen, and the retainer is disposed in a notch portion provided at the visor.

17. An airbag device for a saddled vehicle comprising:
an inflator;

an airbag adapted to be expanded by gas discharged from the inflator; and a retainer accommodating the airbag, the airbag being deployed upward from an opening of the retainer, wherein the retainer is disposed between a meter provided in front of a handle for steering and a headlight provided in front of the meter in a side view of the vehicle, the retainer is disposed between the meter and a wind screen provided in front of the meter in the side view of the vehicle, a visor extending upward beyond the meter is provided between the meter and the wind screen, and the retainer is disposed in a notch portion provided at the visor, the retainer includes a retainer lower portion overlapping the meter from a lower side in a plan view and an upper extending portion extending upward from a front end portion of the retainer lower portion, the upper extending portion extends upward between the meter and the wind screen, and the opening is provided in an upper surface of the upper extending portion, the retainer extends toward a rear upper side along the wind screen disposed to be inclined rear-upward in the side view of the vehicle, the opening provided in the upper surface of the upper extending portion is located below an upper end of the wind screen, and the upper extending portion extends upward relative to a display surface on an upper surface of the meter and covers the display surface from an upper side.

* * * * *